(12) United States Patent
Stevanovic et al.

(10) Patent No.: US 10,157,102 B2
(45) Date of Patent: Dec. 18, 2018

(54) TECHNIQUES TO SCAN AND REORGANIZE MEDIA FILES TO REMOVE GAPS

(71) Applicant: WhatsApp Inc., Mountain View, CA (US)

(72) Inventors: Milan Stevanovic, Menlo Park, CA (US); Abhishek Jain, Menlo Park, CA (US)

(73) Assignee: WHATSAPP INC., Menlo Park, CA (US)

( * ) Notice: Subject to any disclaimer, the term of this patent is extended or adjusted under 35 U.S.C. 154(b) by 168 days.

(21) Appl. No.: 15/394,479

(22) Filed: Dec. 29, 2016

(65) Prior Publication Data

US 2018/0189142 A1    Jul. 5, 2018

(51) Int. Cl.
| | |
|---|---|
| *G06F 11/14* | (2006.01) |
| *H04L 29/06* | (2006.01) |
| *G06F 21/56* | (2013.01) |
| *G06F 21/12* | (2013.01) |
| *H04L 12/58* | (2006.01) |

(52) U.S. Cl.
CPC .......... *G06F 11/1446* (2013.01); *G06F 21/12* (2013.01); *G06F 21/56* (2013.01); *G06F 21/563* (2013.01); *G06F 21/565* (2013.01); *G06F 21/568* (2013.01); *H04L 63/1425* (2013.01); *H04L 63/1433* (2013.01); *G06F 2201/84* (2013.01); *H04L 51/08* (2013.01)

(58) Field of Classification Search
CPC .. G06F 11/1446; G06F 2201/84; G06F 21/56; G06F 21/568; G06F 21/565; G06F 21/563; G06F 21/12; H04L 63/1425; H04L 51/08; H04L 63/1433
See application file for complete search history.

(56) References Cited

U.S. PATENT DOCUMENTS

| | | | | |
|---|---|---|---|---|
| 7,689,619 | B2 * | 3/2010 | Kisliakov | .......... H04N 7/17318 707/741 |
| 7,975,303 | B1 * | 7/2011 | Millard | .................. G06F 21/564 711/110 |
| 8,340,505 | B2 * | 12/2012 | Fan Jiang | ............ G11B 27/034 386/324 |
| 9,742,796 | B1 * | 8/2017 | Salsamendi | ........... H04L 63/145 |
| 2003/0018581 | A1 * | 1/2003 | Bratton | .................... H04L 12/12 705/50 |
| 2003/0188182 | A1 * | 10/2003 | Sato | ........................ H04N 5/783 713/193 |

(Continued)

*Primary Examiner* — Paul Contino

(57) ABSTRACT

Techniques to scan and reorganize media files to remove gaps are described. In one embodiment, an apparatus may comprise a media handling component operative to receive a media file, the media file comprising a header portion and an encoded media portion, the header portion comprising one or more indexing tables, the encoded media portion comprising a plurality of encoded chunks; a media topology component operative to build an encoded media topology list by scanning the one or more indexing tables; and a media rebuilding component operative to build the media file into a rebuilt media file by copying the plurality of encoded chunks while generating one or more replacement indexing tables where the encoded media topology list indicates that the encoded media portion contains one or more unreferenced portions. Other embodiments are described and claimed.

20 Claims, 11 Drawing Sheets

(56) References Cited

U.S. PATENT DOCUMENTS

| | | | |
|---|---|---|---|
| 2004/0003103 A1* | 1/2004 | Witt | G06F 11/1464 709/231 |
| 2004/0003314 A1* | 1/2004 | Witt | G06F 17/30067 714/6.12 |
| 2005/0165853 A1* | 7/2005 | Turpin | G06F 3/0608 |
| 2006/0174026 A1* | 8/2006 | Robinson | H04N 7/17336 709/231 |
| 2007/0041719 A1* | 2/2007 | Takada | G11B 27/11 386/239 |
| 2007/0053658 A1* | 3/2007 | Murakami | G11B 27/105 386/248 |
| 2007/0094290 A1* | 4/2007 | Oka | G11B 20/10 |
| 2008/0243879 A1* | 10/2008 | Gokhale | G06F 11/1453 |
| 2008/0256431 A1* | 10/2008 | Hornberger | G06F 17/30053 715/202 |
| 2008/0294691 A1* | 11/2008 | Chang | G06F 17/30038 |
| 2009/0150419 A1* | 6/2009 | Kim | G06F 21/568 |
| 2010/0031086 A1* | 2/2010 | Leppard | G06F 11/1662 714/15 |
| 2012/0197966 A1* | 8/2012 | Wolf | H04N 21/23424 709/203 |
| 2014/0040582 A1* | 2/2014 | Attarde | G06F 11/1453 711/162 |
| 2014/0181575 A1* | 6/2014 | Kalach | G06F 11/1415 714/6.11 |
| 2014/0372798 A1* | 12/2014 | Chang | G06F 11/1464 714/15 |
| 2016/0313970 A1* | 10/2016 | Malhotra | G06F 3/165 |

\* cited by examiner

600

Receive a media file, the media file comprising a header portion and an encoded media portion, the header portion comprising one or more indexing tables, the encoded media portion comprising a plurality of encoded chunks referenced by the one or more indexing tables.
*602*

Build an encoded media topology list by scanning the one or more indexing tables.
*604*

Rebuild the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks.
*606*

*FIG. 6*

TECHNIQUES TO SCAN AND REORGANIZE MEDIA FILES TO REMOVE GAPS

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to scan and reorganize media files to remove gaps. Some embodiments are particularly directed to techniques to scan and reorganize media files to remove gaps to eliminate an actor vector, to remove an information transmission vector, and to reduce file size. In one embodiment, for example, an apparatus may comprise a media handling component operative to receive a media file, the media file comprising a header portion and an encoded media portion, the header portion comprising one or more indexing tables, the encoded media portion comprising a plurality of encoded chunks referenced by the one or more indexing tables; a media topology component operative to build an encoded media topology list by scanning the one or more indexing tables; and a media rebuilding component operative to build the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
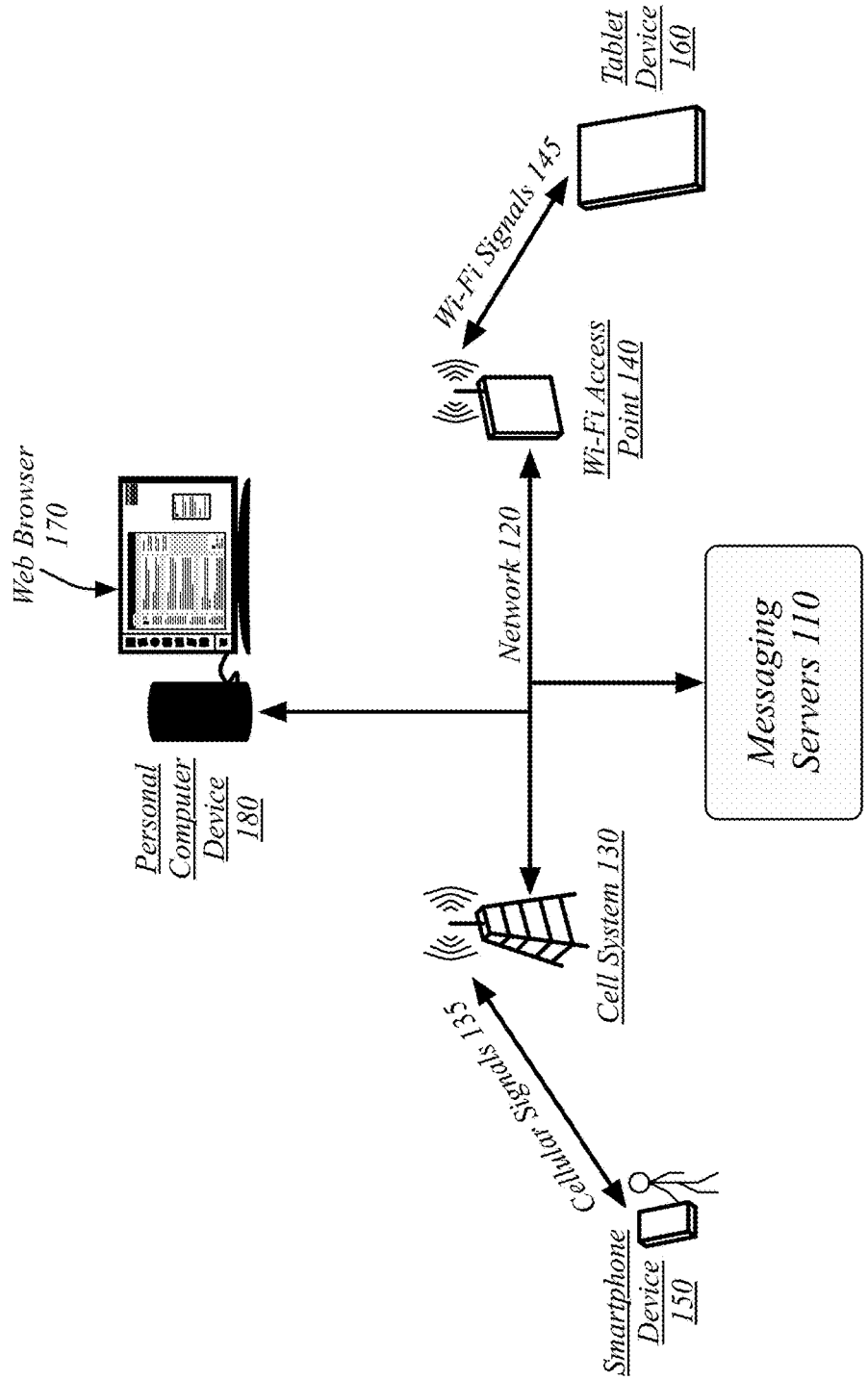
FIG. 1 illustrates an embodiment of a system.

Audio and video exchanged between users is encoded in a media file. An media file may comprise an encoded media portion that consists of the encoding of the media content and a header portion that indexes the encoded media portion to empower the ordered recovery of the encoded media.

In a well-arranged media file, the encoded media portion will contain continuous encoded media content. The encoded media portion may be arranged in pieces, with these pieces indexed by the header portion, but these pieces should be arranged contiguously so as to not leave any gaps.

However, a disarranged media file may have gaps within the encoded media portion, such as between the various pieces of the encoded media portion. In some instances, these gaps may be created accidentally, such as by a faulty encoder. In other instances, these gaps may be created purposefully, such that they may be used maliciously. A region not used for encoding media content might be put to another use, such as for distributing malicious code to a device or for extracting private information from a device.

Therefore, a user may benefit from having the gaps removed from a media file on their device. In addition to the security benefit, a gapless file will take up less space and use less bandwidth to send between devices. Further, the removal of gaps may be accomplished without re-encoding the media file, instead maintaining the current encoding while rearranging the layout of the media file. This may preserve quality that might otherwise be lost during a re-encoding of the media file, and may use less time and processing resources than re-encoding. As a result, user security, device space usage, and device bandwidth usage may all be improved with a modest use of time and processing resources.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a media distribution system 100. In one embodiment, the media distribution system 100 may comprise a computer-implemented system having software applications comprising one or more components. Although the media distribution system 100 shown in FIG. 1 has a limited number of elements in a certain topology, it may be appreciated that the media distribution system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. However, in other embodiments, while encrypted communication may be used between the client devices and server devices, the messaging server devices may be empowered to examine the contents of user messages. Such examination may be used to provide services to the users of the messaging system. In some embodiments, users may be empowered to select whether a particular message thread uses end-to-end encryption (and thereby receive the additional privacy of the messaging servers being prevented from examining the contents of messages) or doesn't (and thereby receive the benefit of the messaging system being able to programmatically examine messages and offer relevant services to the users).

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
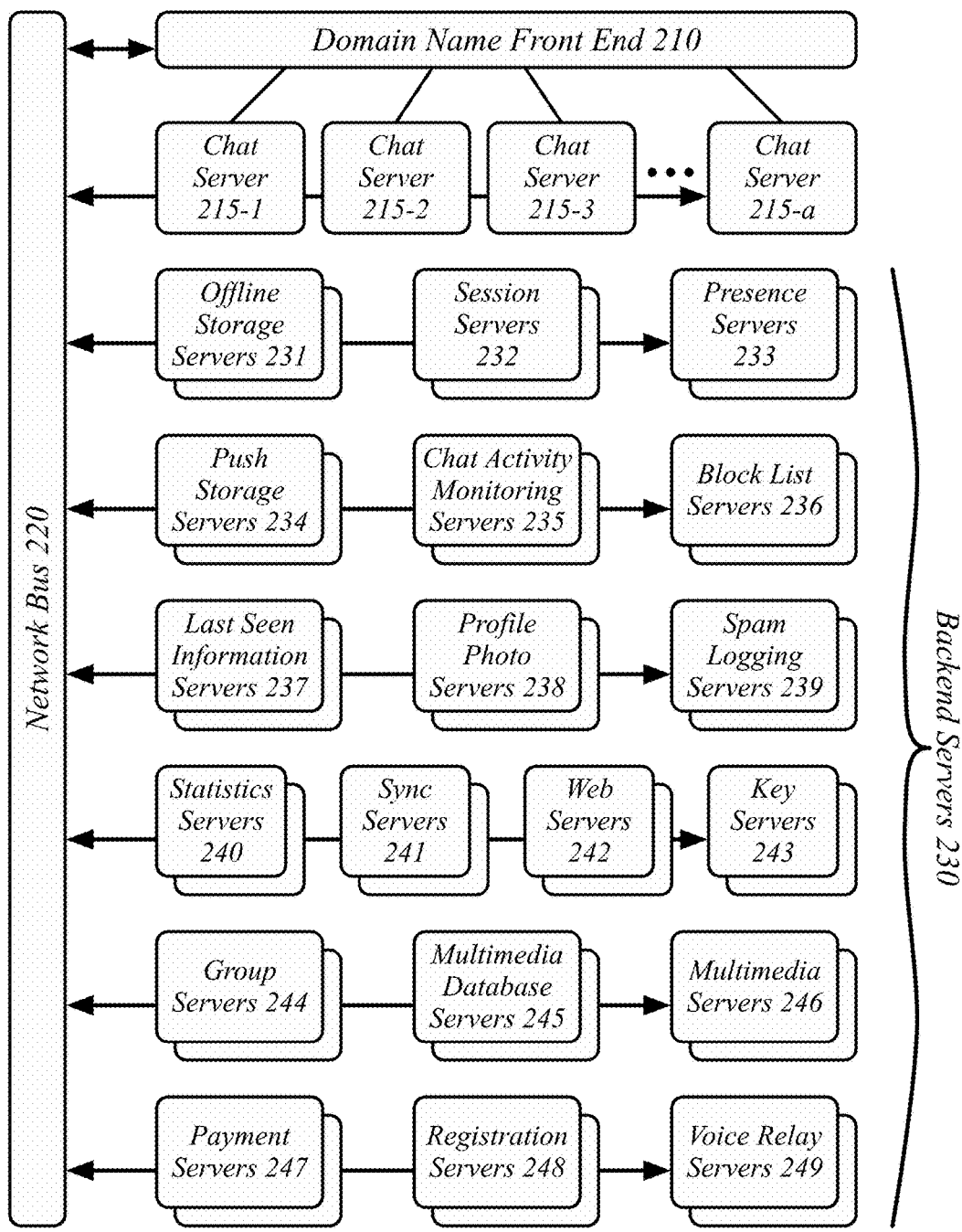
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming audio media distribution system 100 with the operations of the streaming audio media distribution system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access media distribution system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
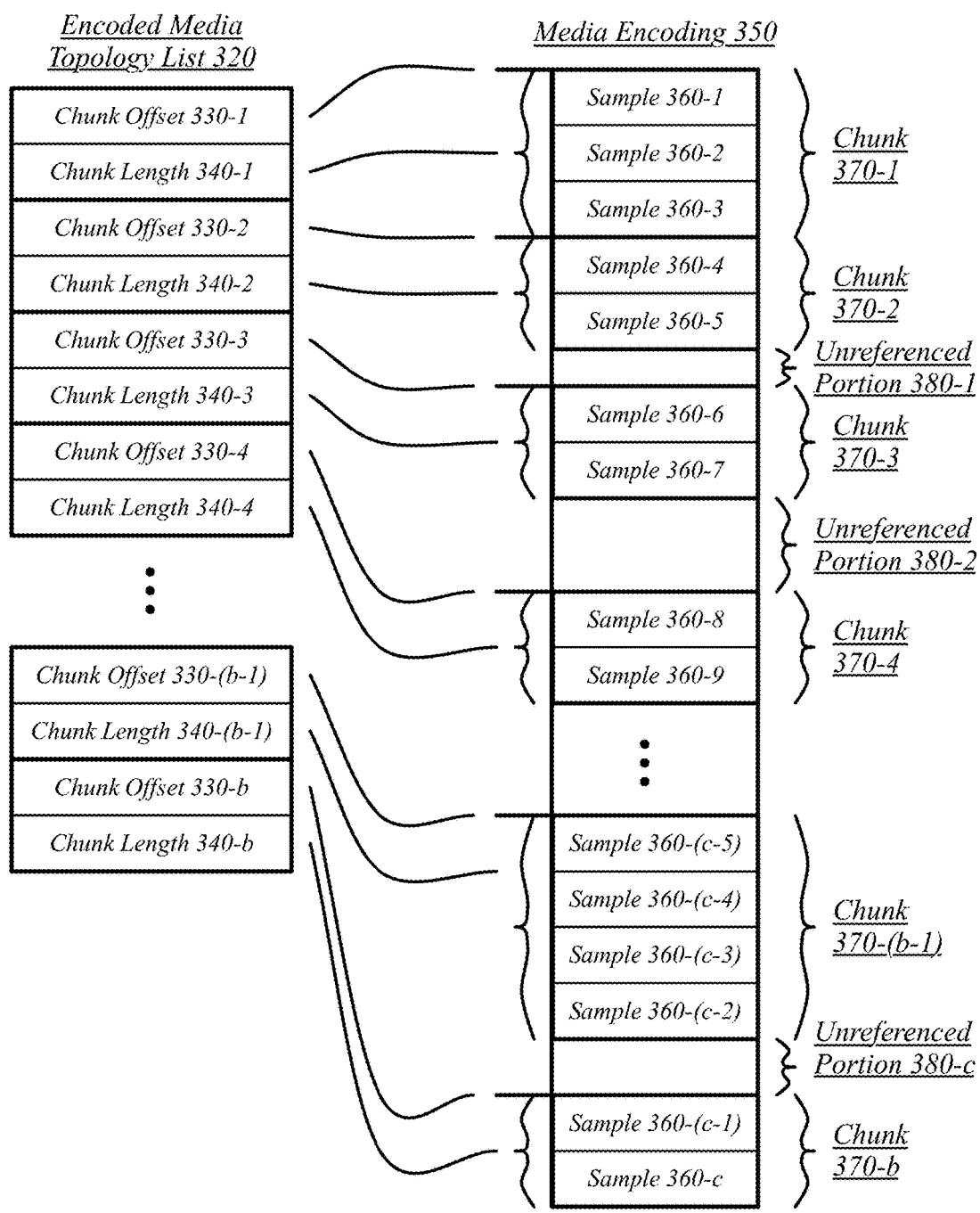
FIG. 3 illustrates an embodiment of an encoded media topology list mapping a media encoding.

FIG. 3 illustrates an embodiment of a mapping 300 of an encoded media topology list 320 for a media encoding 350. A media encoding 350 may comprise a portion of a media file.

A media encoding 350 may be an encoding for, without limitation, a video track. A media encoding 350 is divided into a plurality of chunks 370, wherein each chunk 370 is a contiguous section of encoded video created by the video encoder. Each chunk is further subdivided into one or more samples of a plurality of samples 360 for the media encoding 350.

The header information for a media file may provide metadata describing the media encoding 350 that can be used to map the media encoding 350. The metadata may describe the starting position in the media file for each chunk of the plurality of chunks 370. The metadata may describe the number of samples in each chunk of the plurality of chunks 370. The metadata may also describe the size of each of the samples.

However, this size of each of the samples may be provided in a list that doesn't divide the list of sample sizes according to which chunk each sample is in. Instead, the list may be an ordered list of sample sizes without differentiation of which chunk each sample size is associated with. As such, determining the size of each chunk may involve scanning a sample-size list, with a number of entries equal to the number of samples 360, and comparing that sample-size list to a sample-number list, with a number of entries equal to the number of chunks 370. By using these lists together, the sample sizes of the samples in each chunk may be determined and then summed to determine the size of each chunk.

The encoded media topology list 320 may store the size of each of the chunks 370 as a plurality of chunk lengths 340. Each of the chunks lengths 340 is the size of a particular chunk of the plurality of chunks 370 as determined by summing the sample sizes for each of the samples within each of the chunks 370 according to a sample-size list organized linearly across all the samples 360 of a media encoding 350. The encoded media topology list 320 may store the starting location of each of the chunks 370 as a plurality of chunk offsets 330. Each of the chunk offsets 330 may be determined based on header information indicating the starting location of each of the chunks 370, or according to other techniques. There is a number of each of the chunk offsets 330 and chunk lengths 340 equal to the number of chunks 370 in the media encoding 350, with the chunk offsets 330 and chunk lengths 340 therefore being equal in number.

The encoded media topology list 320 may be used to determine if the media encoding 350 contains any unreferenced portions 380, gaps between the encoding chunks. Similarly, the encoded media topology list 320 may be used to determine if the media encoding 350 contains any overlapping portions, areas that the metadata describes as being within two or more chunks. For a sequential pair of chunks, a first chunk and a second chunk, a gap exists if the chunk offset for the first chunk plus the chunk length for the first chunk is less than the chunk offset for the second chunk. For a sequential pair of chunks, an overlap exists if the chunk offset for the first chunk plus the chunk length for the first chunk is greater than the chunk offset for the second chunk. A media encoding 350 is well arranged if, for each sequential pair of chunks, the chunk offset plus the chunk length of the first chunk is equal to the chunk offset of the second chunk.

Figure 4:
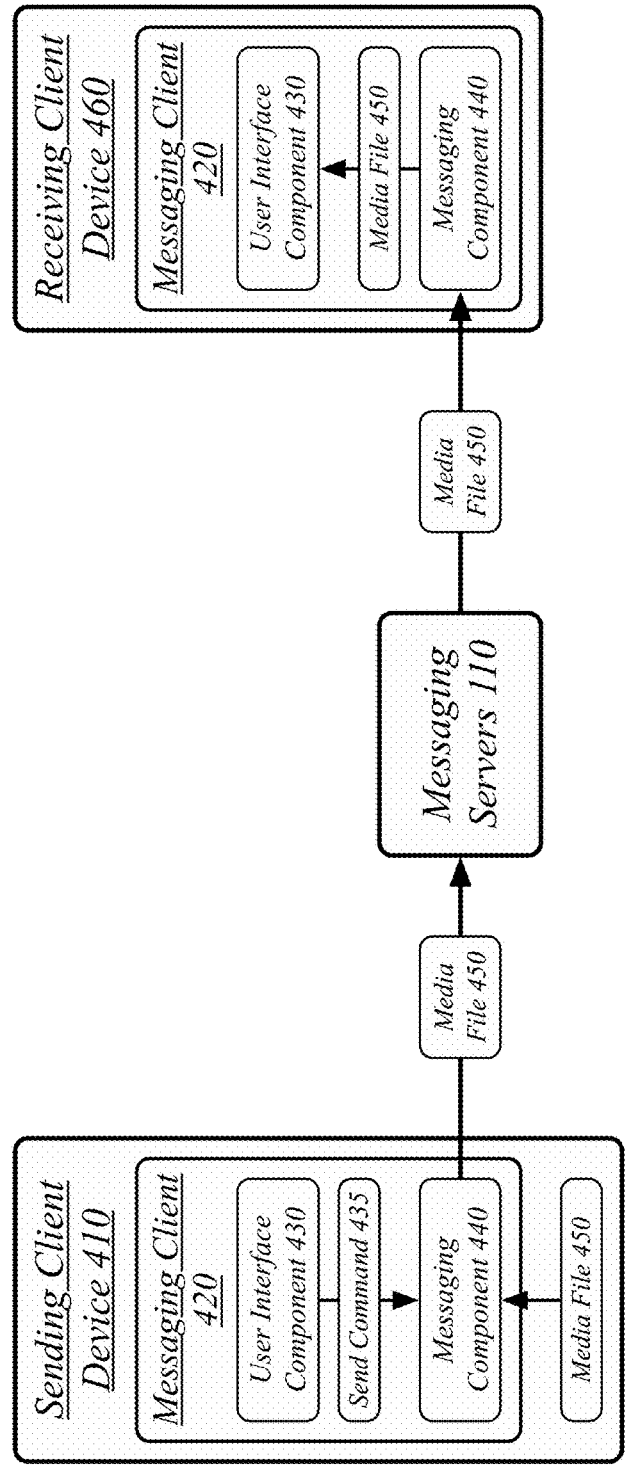
FIG. 4 illustrates a media file distribution through a messaging system.

FIG. 4 illustrates a media file distribution through a messaging system.

The sending client device 410 and receiving client device 460 may be two of a plurality of client devices communicating using a messaging system and implementing the media distribution system 100. The assignment of a device as a sending client device 410 and receiving client device 460 may correspond to the specific interaction being described in FIG. 4 and may not reflect any particular division of capabilities between the client devices 410, 460. Every messaging client 420 on every client device supported by the messaging system may support both sending and receive message and media items. Each of the client devices 410, 460 executes a messaging client 420. The messaging client 420 on each device comprises a plurality of components. The plurality of components may comprise software components. The components of the messaging client 420 may include additional components to those described here and the operations of the messaging client 420 may be divided between components in different configurations in different embodiments.

The messaging client 420 may comprise a messaging component 440. The messaging component 440 may be generally arranged to perform the interactions between the messaging client 420 and the messaging servers 110. The messaging component 440 may send network communication to and receive network communication from messaging servers 110 of the messaging system.

The messaging client 420 may comprise a user interface component 430. The user interface component 430 may be generally arranged to present information to a user of a client device and receive user commands from the user of the client device. The user interface component 430 may display visual information, output audio information, and otherwise present information to a user. The user interface component 430 may receive touch commands, text commands, voice commands, and any other sort of command for the operation of the messaging client 420.

The user interface 430 on a sending client device 410 may receive a send command 435 from its users instructing that a particular media item be sent to the receiving client device 460. The command that the media item be sent to a receiving client device 460 may be implicit in a request that the media item be sent to a particular user of the messaging system, with the messaging system determining the receiving client device 460 to receive the media item in accordance with its association with a requested receiving user. A receiving user may be identified according to a variety of techniques, such as a user account name, user identifier, receiving client device phone number (which may operate as a user identifier), or according to any other technique. The sending of the media item to the receiving client device 460 may be mediated by the messaging servers 110, which may hold and store media items during transmission from one client device to another, so as to accommodate where a client device is offline, powered down, or otherwise unavailable.

The media item may be embodied in a media file 450. In some cases, a local media encoder may be used to generate the media file 450, such as where the messaging system requests that a media item be re-encoded for use by the receiving client device 460. As such, the media file 450 may be a transcoded version of a different media file in a different format.

The messaging component 440 receives the send command 435 from the user via the user interface component 430, retrieves the media file 450 embodying the media item that the user has requested be sent, and sends the media file 450 to the receiving client device 460. Sending the media file 450 to the receiving client device 460 may be mediated by the messaging servers 110, though in some embodiments peer-to-peer file transfer may be used. In some embodiments, the media file 450 may be encrypted using end-to-end encryption techniques using keys located only on one or both of the client devices 410, 460.

In some embodiments, media items may be distributed as part of messages sent via the messaging system. In some embodiments, the media file 450 attached to a message may be included in the sending of the message between the client devices. In other embodiments, the media file 450 may be referenced in the message via a uniform resource location (URL), via a media item identifier for the messaging system, or using any other technique. The media file 450 may be uploaded to the messaging servers 110 by the messaging component 440 of the sending client device 410 and downloaded from the messaging servers 110 by the messaging component 440 of the receiving client device 460, referenced by each of the client devices 410, 460 according to the technique used to identify and locate it. In some embodiments, the messaging component 440 of the receiving client device 460 may wait to download the media file 450, such as by waiting for a user request to download the media file 450 or by waiting for the receiving client device 460 to be on a non-metered network connection instead of a metered network connection, such as by waiting for the receiving client device 460 to be on a Wi-Fi network connection instead of a cellular network connection.

The messaging component 440 of the receiving client device 460 receives the media file 450. The media file 450 is provided to the user interface component 430 and displayed for the user of the receiving client device 460.

Each of the messaging components 440 on each of the client devices 410, 460 may perform a well-arranged media file check for the media file 450 before using the media file 450. The messaging component 440 of the sending client device 410 initiates the well-arranged media file check in response to the request to send the media item and prior to uploading the media file 450 to the messaging servers 110 or otherwise sending the media file 450 to the receiving client device 460. This may serve to protect the sending client device 410 from the media file 450 being used to send user data off the sending client device 410 or otherwise distribute unwanted data from the sending client device 410, as well as potentially reducing the file size and bandwidth usage for the media item.

Similarly, the messaging component 440 of the receiving client device 460 initiates the well-arranged media file check for the media file 450 before storing the media file 450 on the receiving client device 460 or providing the media file 450 to the user interface component 430. This may serve to protect the receiving client device 460 from the media file 450 being used to distribute malicious code to the receiving client device 460 and may reduce the space used to store the media file 450 on the receiving client device 460.

The well-arranged media file check may comprise a process of generating one or more encoding media topology lists—such as one for each media track of the media file 450—using them to determine whether the media file 450 contains any unreferenced portions, and eliminating the unreferenced portions if found. Additionally, the well-arranged media file check may include determining, based on the one or more encoding media topology lists, whether the media file 450 contains any overlapping portions and possibly rejecting or repairing the media file 450 if overlapping portions are found.

Figure 5:
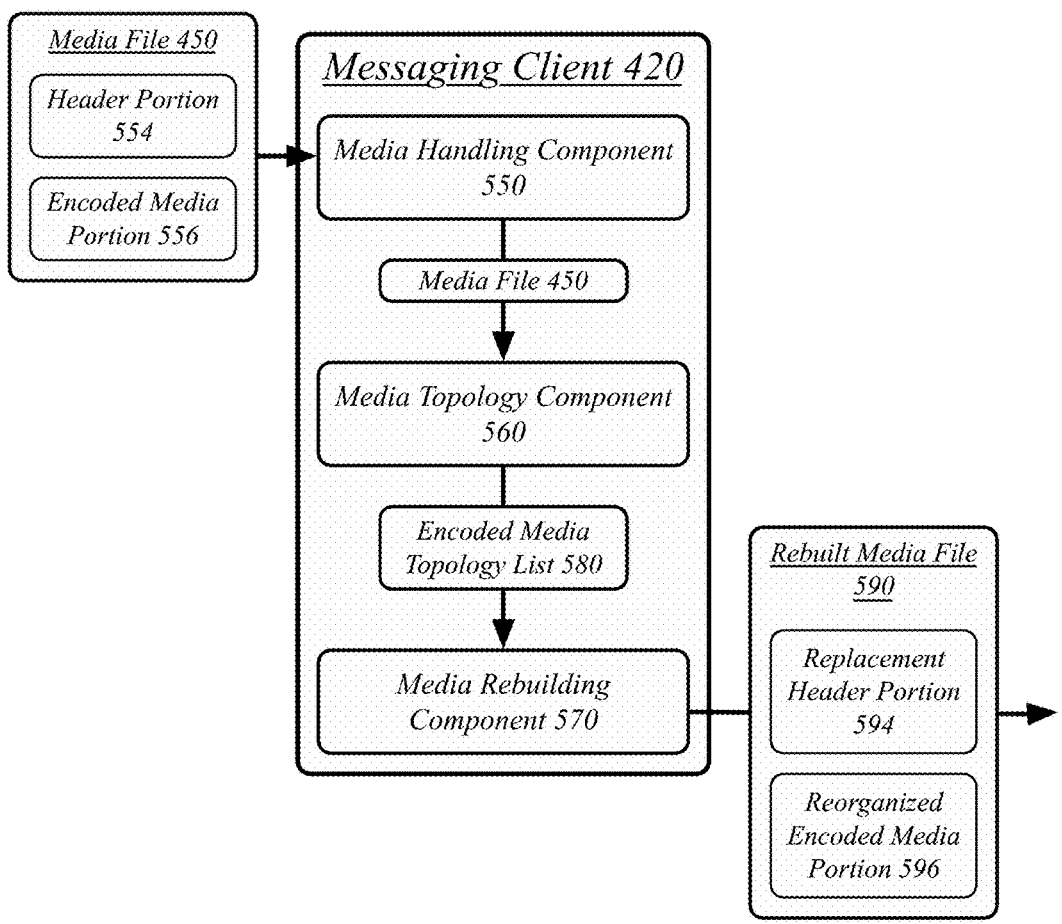
FIG. 5 illustrates a media file being analyzed and reorganized into a rebuilt media file.

FIG. 5 illustrates a media file being analyzed and reorganized into a rebuilt media file.

A media handling component 550 of the messaging client 420 receives a media file 450. The media file 450 comprises a header portion 554 and an encoded media portion 556. The header portion 554 comprises one or more indexing tables. The encoded media portion 556 comprises a plurality of encoded chunks referenced by the one or more indexing tables. The media file 450 may be received via a messaging system in association with a user message. The media file 450 may be provided to the media handling component 550 as part of a request to perform a well-arranged media file check on the media file 450.

The media topology component 560 receives the media file 450 from the media handling component 550. The media topology component 560 builds an encoded media topology list 580 by scanning the one or more indexing tables. Each of the plurality of encoded chunks of the media file 450 comprises one or more samples, with at least one or more of the encoded chunks comprising two or more samples. The media topology component 560 calculates chunk sizes for each of the plurality of encoded chunks by matching a samples-per-chunk table with a sample-size table, where the one or more indexing tables of the header portion 554 comprise the samples-per-chunk table and the sample-size table. The sample-size table may specifically comprises a sequential listing of sample sizes for a media track. A sequential listing of samples sizes in the sample-size table is scanned in order, matched with the sample-per-chunk table to determine the samples sizes for the samples stored in each of the chunks. The sample sizes for each of the chunks is summed to determine the chunk size for each chunk.

An encoded media topology list 580 may comprise a list of tuples consisting of a chunk offset and a chunk byte length. In some embodiments, the tuples may also comprise a chunk media type. The chunk offset describes the starting position of a chunk within the media file 450. The chunk byte length describes the length of the chunk, as determined by summing the sample sizes for each of the samples in the chunk. Without limitation, the chunk media type for each chunk may comprise one of a video type, an audio type, and a text type.

A media rebuilding component 570 receives the encoded media topology list 580 from the media topology component 560 and the media file 450 from either the media handling component 550 or media topology component 560. It will be appreciated that a component—such as the media handling component 550, the media topology component 560, or the media rebuilding component 570—receiving a media file 450 may correspond to a file identifier, file handle, or other file reference being passed between components.

The media rebuilding component 570 rebuilds the media file 450 into a rebuilt media file 590 where the encoded media topology list 580 indicates that the encoded media portion 556 contains one or more unreferenced portions. The media rebuilding component 570 copies the plurality of encoded chunks while generating one or more replacement indexing tables. The rebuilt media file 590 excludes the one or more unreferenced portions by contiguously writing the plurality of encoded chunks in the reorganized encoded media portion 596.

The rebuilt media file 590 comprises a replacement header portion 594 comprising the one or more replacement indexing tables. The one or more replacement indexing tables may comprise a replacement chunk-offset table. This replacement chunk-offset table accommodates the excluding of the one or more unreferenced portions. Additional header information may be copied from the header portion 554, such as a media item name or other media file information.

The rebuilt media file 590 comprises a reorganized encoded media portion 596, with the reorganized encoded media portion 596 comprising the copied encoded chunks reorganized to eliminate the one or more unreferenced portions. This may result in the rebuilt media file 590 being smaller in file size than the original media file 450.

The well-arranged media file check of the messaging client 420 may also check for and react to a media file 450 with overlapping references. In some embodiments, the media rebuilding component 570 may reject the media file 450 where the encoded media topology list indicates that the indexing tables contain overlapping references. A media file 450 with overlapping references isn't just badly formed in the sense of being a non-optimal layout that wastes space and creates spaces for potentially malicious information to be sent between devices, but also badly formed in the sense that the encoding is malformed if two chunks occupy overlapping space. As such, the media file 450 may be rejected to avoid playback of a damaged media file.

Alternatively, the media rebuilding component 570 may repair the media file 450 where the encoded media topology list 580 indicates that the indexing tables contain overlapping references. Repairing the media file 450 may consist of submitting the media file 450 to an encoding utility for repair and/or re-encoding and receiving a repaired media file in return. The media rebuilding component 570 may instruct the media topology component 560 to generate a second encoded media topology list, this time generated based on the repaired media file. The media rebuilding component 570 then processes the repaired media file with the second encoded media topology list to confirm that the repaired media file is well-arranged.

Where the repaired media file is well-arranged, it may then be distributed to another client device or saved and displayed on that client device. In some embodiments, the media rebuilding component 570 will only repair a media file 450 where the media file was received in response to a local user upload request and not where the media file 450 was received from another device, such as another client device, as may be distributed via one or more server devices. Instead, the media file 450 may be rejected where the media file 450 was received from another device. The messaging component 440 may report that the media file 450 was broken to the messaging servers 110 and/or sending client device 410. In some embodiments, the messaging component 440 may re-download the media file 450 to determine if the broken media file was the result of a corrupted download. Where the repaired media file is not well-arranged, the media file 450 may be rejected by the messaging client 420 due to the encoding problems by the encoder.

The media file may comprise a plurality of tracks. The plurality of tracks may comprise one or more audio tracks and one or more video tracks, thereby making up an audio/video (A/V) file. A media file with one audio track and one video track may comprise a movie file with synchronized video and audio. The plurality of tracks comprise the plurality of encoded chunks, with the encoded chunks divided between the tracks. A distinct encoding media topology list 580 may be generated for each of the tracks, with the well-arranged media file check being performed for each of the tracks in turn. Because one or more of the plurality of tracks may be reduced in size thanks to the removal of gaps, the tracks may be moved in their position in the media file 450—tracks being moved forward in position where one or more earlier tracks were reduced in size.

Where the media file 450 contains unreferenced portions, the media rebuilding component 570 may copy the one or more unreferenced portions to an unreferenced-portion reporting record, the unreferenced-portion reporting record thereby comprising the contents of the unreferenced-portions of the encoded media portion 556. The messaging component 440 may then upload the unreferenced-portion reporting record to a malicious-file detection server. This uploaded unreferenced-portion reporting record may be examined by an administrator of a messaging system to determine whether it comprises malicious content and warrants further investigation. In some embodiments, user permission may be requested before generating and/or uploading an unreferenced-portion reporting record.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a media file, the media file comprising a header portion and an encoded media portion, the header portion comprising one or more indexing tables, the encoded media portion comprising a plurality of encoded chunks referenced by the one or more indexing tables at block 602.

The logic flow 600 may build an encoded media topology list by scanning the one or more indexing tables at block 604.

The logic flow 600 may rebuild the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks at block 606.

The embodiments are not limited to this example.

Figure 7:
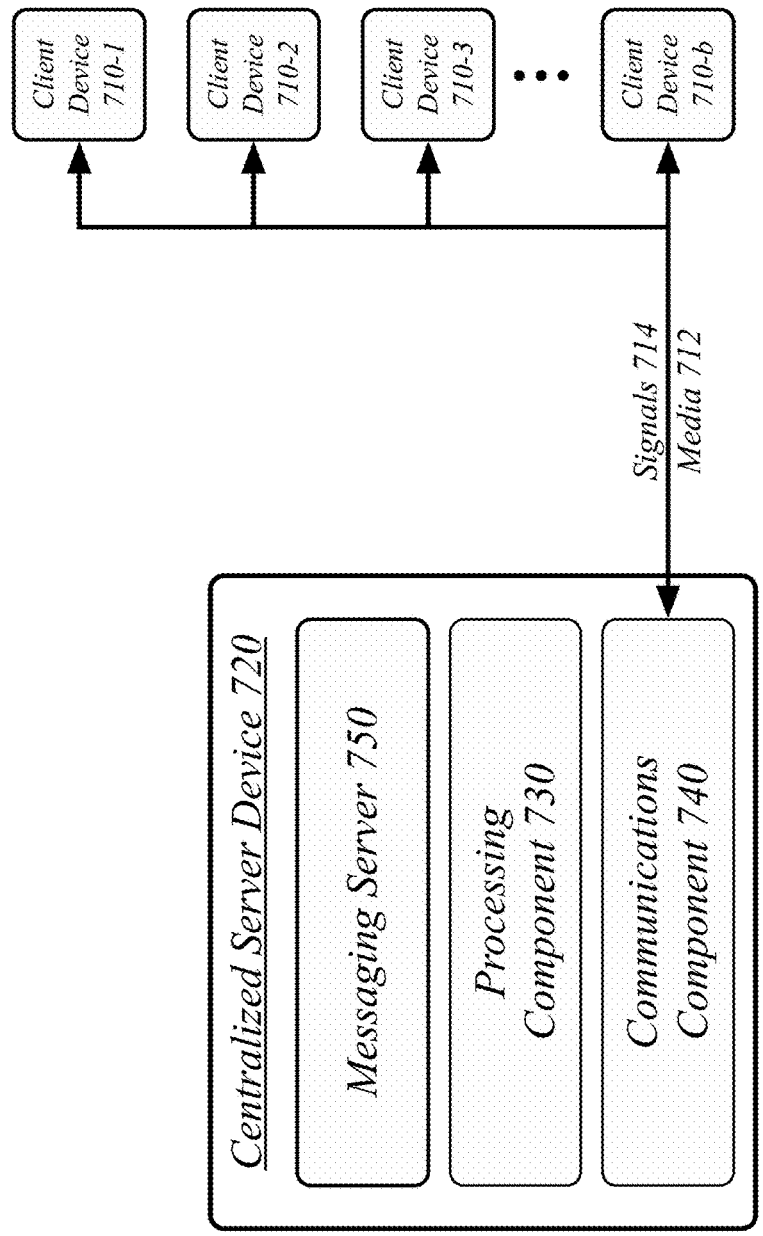
FIG. 7 illustrates an embodiment of a centralized system for the system of FIG. 1.

FIG. 7 illustrates a block diagram of a centralized system 700. The centralized system 700 may implement some or all of the structure and/or operations for the messaging flow visualization media distribution system 100 in a single computing entity, such as entirely within a single centralized server device 720.

The centralized server device 720 may comprise any electronic device capable of receiving, processing, and sending information for the messaging flow visualization media distribution system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the messaging flow visualization media distribution system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the messaging flow visualization media distribution system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation.

The centralized server device 720 may execute a messaging server 750. The messaging server 750 may comprise a messaging server for a messaging system 110. The messaging server 750 may provide messaging operations for a plurality of client devices 710, receiving and sending messages between the client devices 710. The client devices 710 may correspond to one or more of a smartphone device 150, tablet device 160, personal computer device 170, and/or any other client device.

Figure 8:
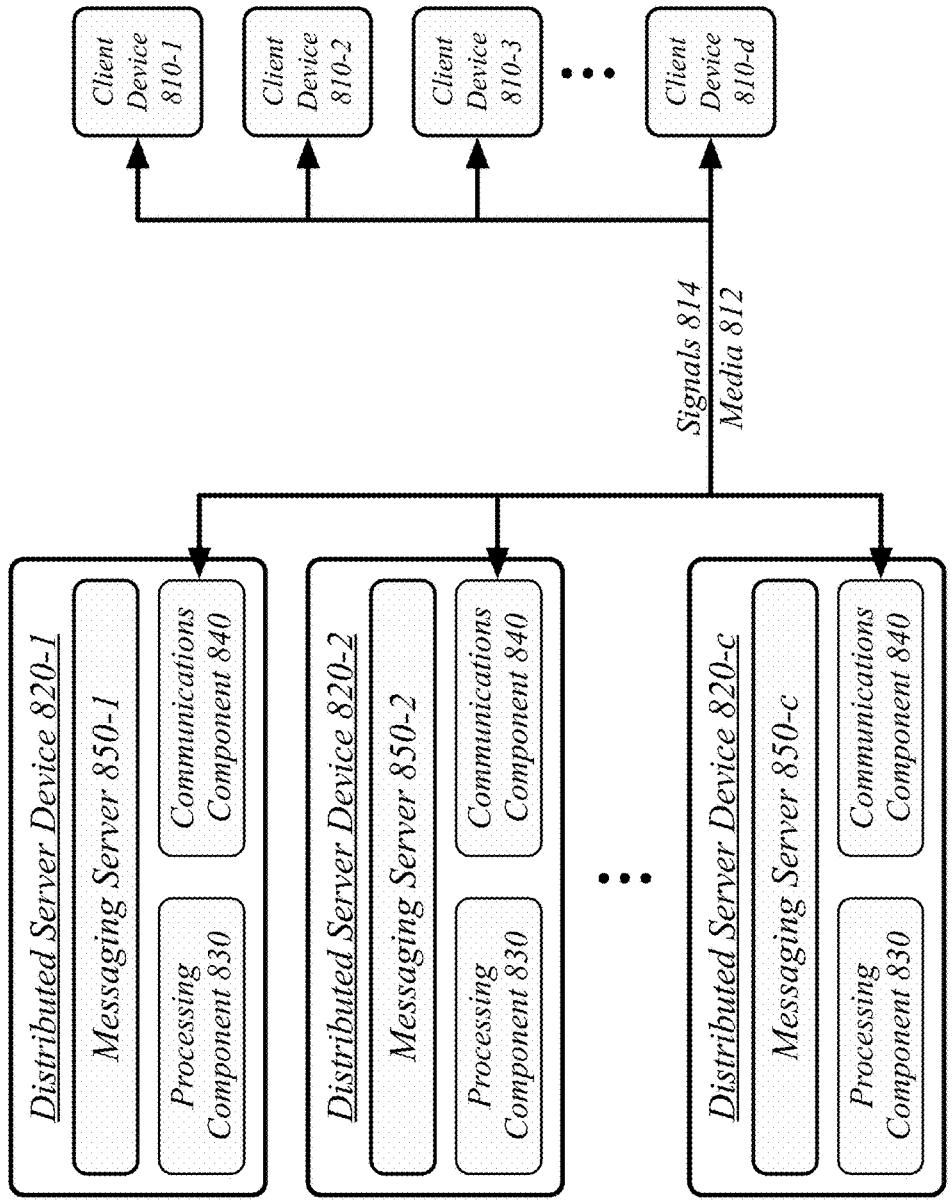
FIG. 8 illustrates an embodiment of a distributed system for the system of FIG. 1.

FIG. 8 illustrates a block diagram of a distributed system 800. The distributed system 800 may distribute portions of the structure and/or operations for the messaging flow visualization media distribution system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 820. In general, the distributed server devices 820 may be the same or similar to the centralized server device 820 as described with reference to FIG. 8. For instance, the distributed server devices 820 may each comprise a processing component 830 and a communications component 840 which are the same or similar to the processing component 730 and the communications component 740, respectively, as described with reference to FIG. 7. In another example, the distributed server devices 820 may communicate over a communications media 812 using communications signals 814 via the communications components 840.

The distributed server devices 820 may comprise or employ one or more server programs that operate to perform various methodologies in accordance with the described embodiments. In one embodiment, for example, the distributed server devices 820 may each execute one of a plurality of messaging servers 850. The messaging servers 850 may comprise messaging servers for a messaging system 110. The messaging servers 850 may provide messaging operations for a plurality of client devices 810, receiving and sending messages between the client devices 810. The client devices 810 may correspond to one or more of a smartphone device 150, tablet device 160, personal computer device 180, and/or any other client device.

Figure 9:
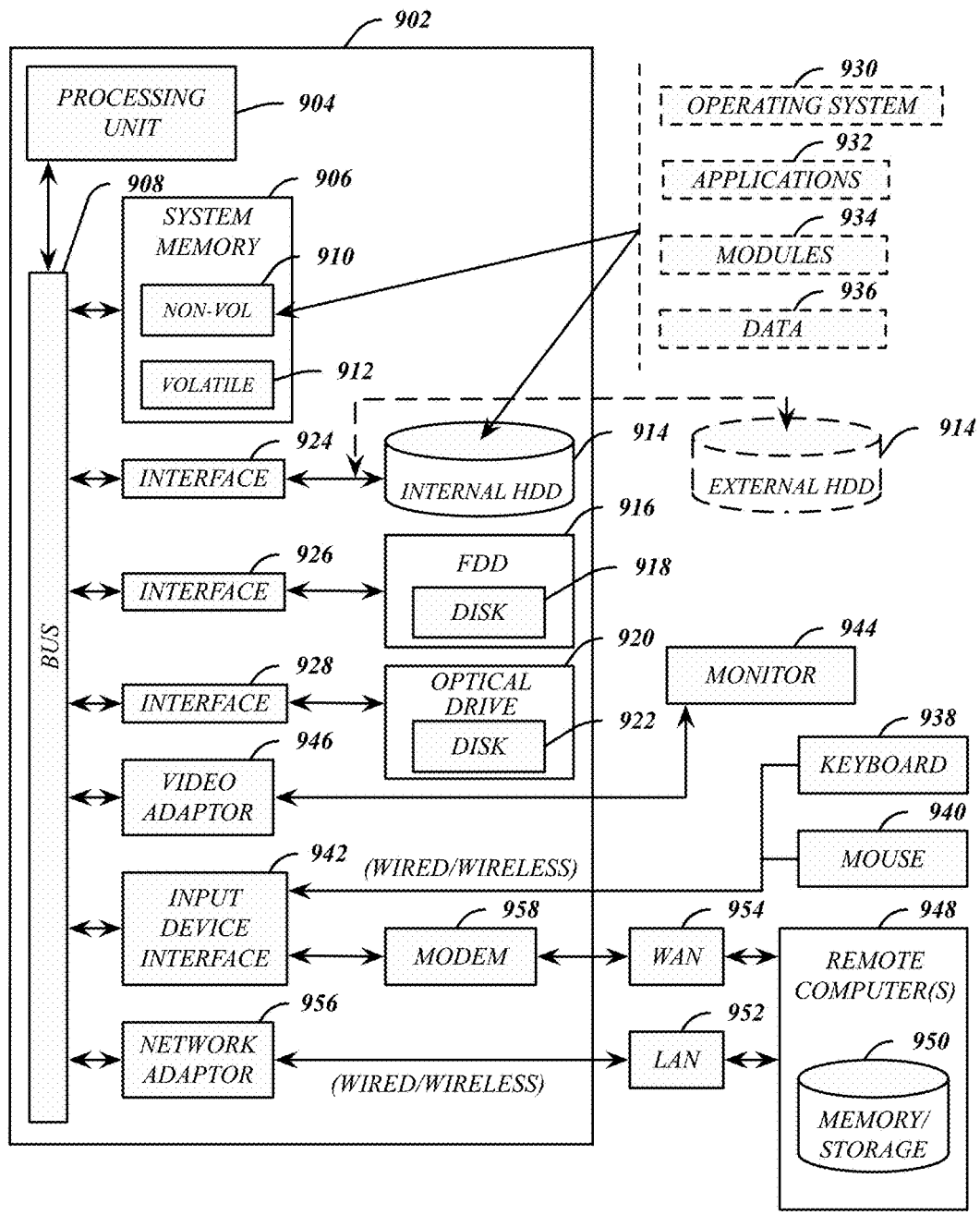
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the media distribution system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
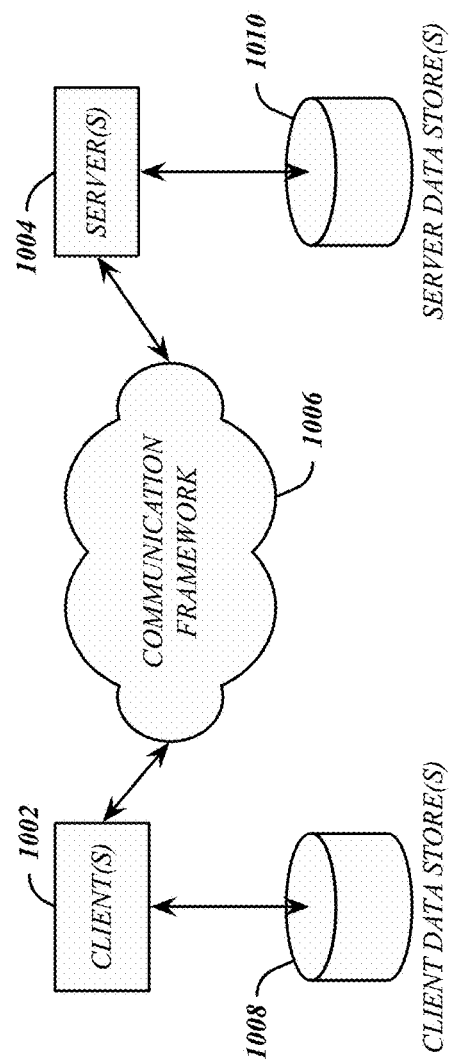
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the first server device 910. The servers 1004 may implement the second server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
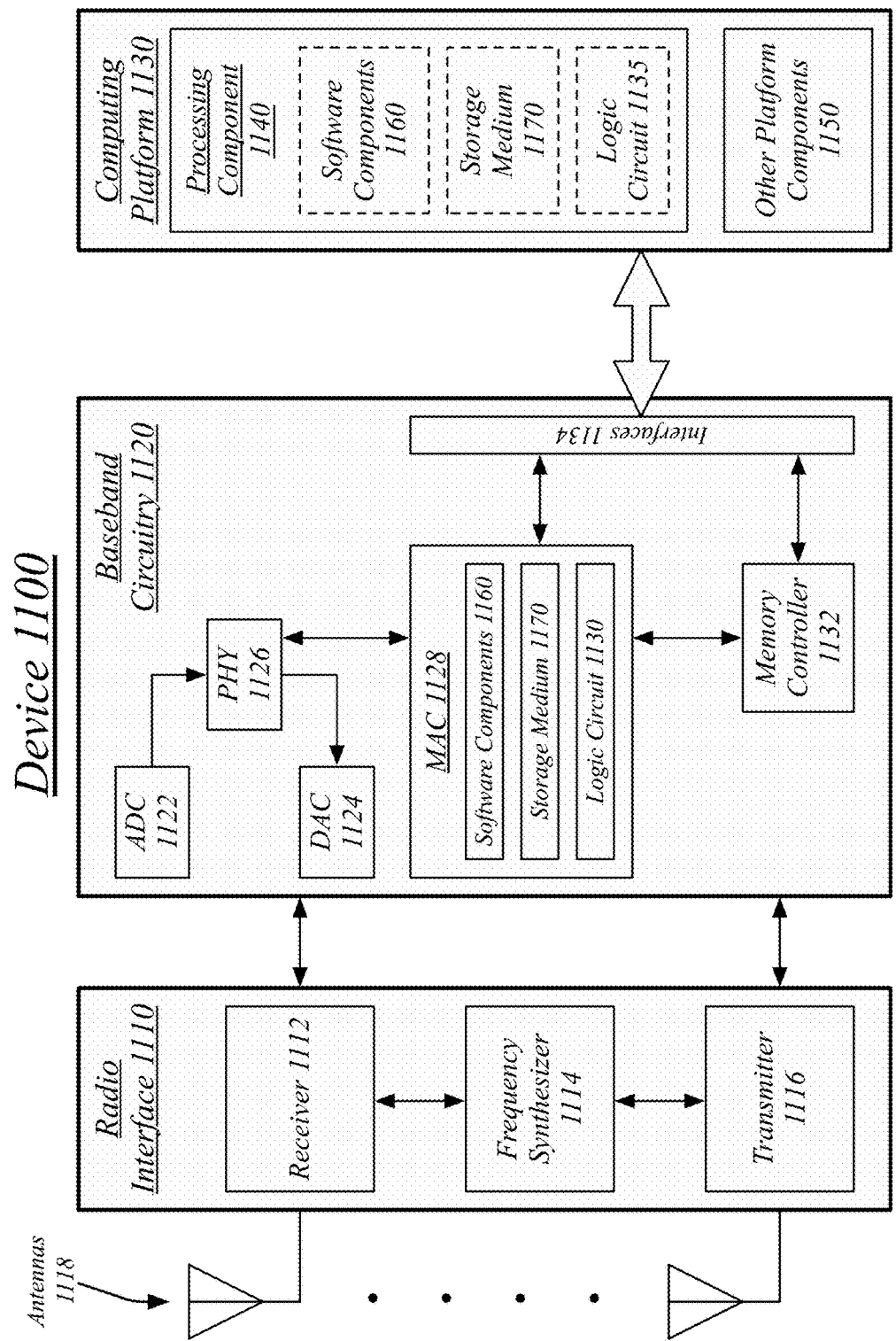
FIG. 11 illustrates an embodiment of a radio device architecture.

FIG. 11 illustrates an embodiment of a device 1100 for use in a multicarrier OFDM system, such as the media distribution system 100. Device 1100 may implement, for example, software components 1160 as described with reference to media distribution system 100 and/or a logic circuit 1135. The logic circuit 1135 may include physical circuits to perform operations described for the media distribution system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the media distribution system 100 and/or logic circuit 1135 in a single computing entity, such as entirely within a single device. Alternatively, the device 1100 may distribute portions of the structure and/or operations for the media distribution system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the media distribution system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a media file, the media file comprising a header portion and an encoded media portion, the header portion comprising one or more indexing tables, the encoded media portion comprising a plurality of encoded chunks referenced by the one or more indexing tables; building an encoded media topology list by scanning the one or more indexing tables; and rebuilding the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks.

A computer-implemented method may further comprise the rebuilt media file smaller in file size than the media file.

A computer-implemented method may further comprise the media file comprising a plurality of tracks, wherein the plurality of tracks comprise one or more audio tracks and one or more video tracks, wherein the plurality of tracks comprise the plurality of encoded chunks.

A computer-implemented method may further comprise the encoded media topology list comprising a list of tuples each comprising a chunk offset, chunk byte length, and chunk media type.

A computer-implemented method may further comprise wherein the chunk media type for each chunk comprises one of a video type, an audio type, and a text type.

A computer-implemented method may further comprise rejecting the media file where the encoded media topology list indicates that the indexing tables contain overlapping references.

A computer-implemented method may further comprise repairing the media file where the encoded media topology list indicates that the indexing tables contain overlapping references and the media file was received in response to a local user upload request.

A computer-implemented method may further comprise wherein the media file is received via a messaging system in association with a user message.

A computer-implemented method may further comprise each of the plurality of encoded chunks comprising one or more samples, further comprising: calculating chunk sizes for each of the plurality of encoded chunks by matching a samples-per-chunk table with a sample-size table, wherein the one or more indexing tables comprises the samples-per-chunk table and the sample-size table.

A computer-implemented method may further comprise wherein the sample-size table comprises a sequential listing of sample sizes for a media track.

A computer-implemented method may further comprise wherein the one or more replacement indexing tables comprises a replacement chunk-offset table, wherein the replacement chunk-offset table accommodates the excluding of the one or more unreferenced portions.

A computer-implemented method may further comprise copying the one or more unreferenced portions to an unreferenced-portion reporting record; and uploading the unreferenced-portion reporting record to a malicious-file detection server.

An apparatus may comprise a processor circuit on a device; a media handling component operative on the processor circuit to receive a media file, the media file comprising a header portion and an encoded media portion, the header portion comprising one or more indexing tables, the encoded media portion comprising a plurality of encoded chunks referenced by the one or more indexing tables; a media topology component operative on the processor circuit to build an encoded media topology list by scanning the one or more indexing tables; and a media rebuilding component operative on the processor circuit to build the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a media file, the media file comprising a header portion and an encoded media portion, the header portion comprising one or more indexing tables, the encoded media portion comprising a plurality of encoded chunks referenced by the one or more indexing tables;
building an encoded media topology list by scanning the one or more indexing tables; and
rebuilding the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks.

2. The method of claim 1, the encoded media topology list comprising a list of tuples each comprising a chunk offset, chunk byte length, and chunk media type.

3. The method of claim 1, comprising:
rejecting the media file where the encoded media topology list indicates that the indexing tables contain overlapping references.

4. The method of claim 1, comprising:
repairing the media file where the encoded media topology list indicates that the indexing tables contain overlapping references and the media file was received in response to a local user upload request.

5. The method of claim 1, wherein the media file is received via a messaging system in association with a user message.

6. The method of claim 1, each of the plurality of encoded chunks comprising one or more samples, further comprising:
calculating chunk sizes for each of the plurality of encoded chunks by matching a samples-per-chunk table with a sample-size table, wherein the one or more indexing tables comprises the samples-per-chunk table and the sample-size table.

7. The method of claim 1, wherein the one or more replacement indexing tables comprises a replacement chunk-offset table, wherein the replacement chunk-offset table accommodates the excluding of the one or more unreferenced portions.

8. The method of claim 1, further comprising:
copying the one or more unreferenced portions to an unreferenced-portion reporting record; and
uploading the unreferenced-portion reporting record to a malicious-file detection server.

9. An apparatus, comprising:
a processor circuit on a device;
a media handling component operative on the processor circuit to receive a media file, the media file comprising a header portion and an encoded media portion, the header portion comprising one or more indexing tables, the encoded media portion comprising a plurality of encoded chunks referenced by the one or more indexing tables;

a media topology component operative on the processor circuit to build an encoded media topology list by scanning the one or more indexing tables; and a media rebuilding component operative on the processor circuit to build the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks.

10. The apparatus of claim 9, the encoded media topology list comprising a list of tuples each comprising a chunk offset, chunk byte length, and chunk media type.

11. The apparatus of claim 9, further comprising:
the media rebuilding component operative to reject the media file where the encoded media topology list indicates that the indexing tables contain overlapping references.

12. The apparatus of claim 9, further comprising:
the media rebuilding component operative to repair the media file where the encoded media topology list indicates that the indexing tables contain overlapping references and the media file was received in response to a local user upload request.

13. The apparatus of claim 9, each of the plurality of encoded chunks comprising one or more samples, further comprising:
the media topology component operative to calculate chunk sizes for each of the plurality of encoded chunks by matching a samples-per-chunk table with a sample-size table, wherein the one or more indexing tables comprises the samples-per-chunk table and the sample-size table.

14. The apparatus of claim 9, wherein the one or more replacement indexing tables comprises a replacement chunk-offset table, wherein the replacement chunk-offset table accommodates the excluding of the one or more unreferenced portions.

15. At least one computer-readable storage medium comprising instructions that, when executed, cause a system to:
receive a media file, the media file comprising a header portion and an encoded media portion, the header portion comprising one or more indexing tables, the encoded media portion comprising a plurality of encoded chunks referenced by the one or more indexing tables;

build an encoded media topology list by scanning the one or more indexing tables; and rebuild the media file into a rebuilt media file by copying the plurality of encoded chunks while generating one or more replacement indexing tables where the encoded media topology list indicates that the encoded media portion contains one or more unreferenced portions, wherein the rebuilt media file excludes the one or more unreferenced portions by contiguously writing the plurality of encoded chunks.

16. The computer-readable storage medium of claim 15, the encoded media topology list comprising a list of tuples each comprising a chunk offset, chunk byte length, and chunk media type.

17. The computer-readable storage medium of claim 15, comprising further instructions that, when executed, cause a system to:
reject the media file where the encoded media topology list indicates that the indexing tables contain overlapping references.

18. The computer-readable storage medium of claim 15, comprising further instructions that, when executed, cause a system to:
repair the media file where the encoded media topology list indicates that the indexing tables contain overlapping references and the media file was received in response to a local user upload request.

19. The computer-readable storage medium of claim 15, each of the plurality of encoded chunks comprising one or more samples, comprising further instructions that, when executed, cause a system to:
calculate chunk sizes for each of the plurality of encoded chunks by matching a samples-per-chunk table with a sample-size table, wherein the one or more indexing tables comprises the samples-per-chunk table and the sample-size table.

20. The computer-readable storage medium of claim 15, wherein the one or more replacement indexing tables comprises a replacement chunk-offset table, wherein the replacement chunk-offset table accommodates the excluding of the one or more unreferenced portions.

* * * * *